United States Patent
Arbjerg et al.

(10) Patent No.: US 10,723,378 B2
(45) Date of Patent: Jul. 28, 2020

(54) HYDRAULIC STEERING UNIT

(71) Applicant: Danfoss Power Solutions ApS, Nordborg (DK)

(72) Inventors: Niels Arbjerg, Sydals (DK); Charles Anthony Bates, Soenderborg (DK); Poul Ennemark, Soenderborg (DK); Mogens Frederiksen, Sydals (DK); Casper Mikael Olesen, Soenderborg (DK)

(73) Assignee: Danfoss Power Solutions ApS, Nordborg (DK)

( * ) Notice: Subject to any disclaimer, the term of this patent is extended or adjusted under 35 U.S.C. 154(b) by 137 days.

(21) Appl. No.: 15/970,211

(22) Filed: May 3, 2018

(65) Prior Publication Data

US 2018/0319426 A1 Nov. 8, 2018

(30) Foreign Application Priority Data

May 8, 2017 (DE) .......................... 10 2017 109 795

(51) Int. Cl.
*B62D 5/065* (2006.01)
*B62D 5/093* (2006.01)
(Continued)

(52) U.S. Cl.
CPC .............. *B62D 5/065* (2013.01); *B62D 5/08* (2013.01); *B62D 5/093* (2013.01); *B62D 5/14* (2013.01)

(58) Field of Classification Search
CPC .......... B62D 5/065; B62D 5/08; B62D 5/093; B62D 5/14
See application file for complete search history.

(56) References Cited

U.S. PATENT DOCUMENTS 4,372,413 A * 2/1983 Petersen ................ B62D 5/097
137/625.23
4,412,415 A * 11/1983 Thomsen ............... B62D 5/093
60/384
(Continued)

FOREIGN PATENT DOCUMENTS

CN 104670316 A 6/2015
DE 3744346 A1 7/1988
(Continued)

OTHER PUBLICATIONS

International Search Report for Serial No. PCT/EP2018/060035 dated Apr. 19, 2018.

*Primary Examiner* — Jacob D Knutson
*Assistant Examiner* — Michael R Stabley
(74) *Attorney, Agent, or Firm* — McCormick, Paulding & Huber PLLC

(57) ABSTRACT

A hydraulic steering unit (1) is described comprising a supply port arrangement having a pressure port (8) connected to a main flow path (2) and a tank port (5) connected to a tank flow path (3), a working port arrangement having a left working port (L) connected to a left working flow path (4) and a right working port (R) connected to a right working flow path (5), a variable first left orifice (A2L) connected to the main flow path (2) and to the left working flow path (4), a variable first right orifice (A2R) connected to the main flow path (2) and to the right working flow path (5), a variable second left orifice (A3L) connected to the left working flow path (4) and to the tank flow path (3), and a variable second right orifice (A3R) connected to the right working flow path (5) and to the tank flow path (3). Such a steering unit should allow comfortable steering. To this end a measuring motor (15) is arranged in one of the working flow parts (4, 5).

15 Claims, 1 Drawing Sheet

(51) Int. Cl.
B62D 5/08 (2006.01)
B62D 5/14 (2006.01)

(56) References Cited

U.S. PATENT DOCUMENTS

| | | | | |
|---|---|---|---|---|
| 4,432,270 A | * | 2/1984 | Kyster | B62D 5/12 |
| | | | | 60/384 |
| 4,505,110 A | * | 3/1985 | von Huth Smith | B62D 5/093 |
| | | | | 180/403 |
| 4,676,334 A | | 6/1987 | Nakamura et al. | |
| 4,860,846 A | * | 8/1989 | Uchida | B62D 5/083 |
| | | | | 180/423 |
| 4,862,985 A | | 9/1989 | Uchida et al. | |
| 4,958,493 A | * | 9/1990 | Schutten | B62D 5/097 |
| | | | | 137/596.13 |
| 5,515,938 A | * | 5/1996 | Haga | B62D 5/083 |
| | | | | 180/417 |
| 5,819,532 A | * | 10/1998 | Wang | B62D 5/09 |
| | | | | 60/384 |
| 7,631,590 B2 | * | 12/2009 | Thomsen | B62D 5/065 |
| | | | | 60/384 |
| 9,242,668 B2 | * | 1/2016 | Ennemark | B62D 5/093 |
| 9,550,521 B2 | * | 1/2017 | Andersen | B62D 5/093 |
| 10,161,425 B2 | * | 12/2018 | Liljenberg | F15B 11/08 |
| 2002/0092698 A1 | * | 7/2002 | Juul | B62D 5/093 |
| | | | | 180/419 |
| 2014/0298792 A1 | * | 10/2014 | Andersen | B62D 5/093 |
| | | | | 60/433 |
| 2016/0298658 A1 | * | 10/2016 | Liljenberg | F15B 11/08 |

FOREIGN PATENT DOCUMENTS

| | | |
|---|---|---|
| EP | 2786915 A1 | 10/2014 |
| EP | 3078571 A1 | 10/2016 |

* cited by examiner

HYDRAULIC STEERING UNIT

CROSS-REFERENCE TO RELATED APPLICATION

This application claims foreign priority benefits under U.S.C. § 119 to German Patent Application No. 10 2017 109 795.3 filed on May 8, 2017, the content of which is hereby incorporated by reference in its entirety.

TECHNICAL FIELD

The present invention relates to a hydraulic steering unit comprising a supply port arrangement having a pressure port connected to a main flow path and a tank port connected to a tank flow path, a working port arrangement having a left working port connected to a left working flow path and a right working port connected to a right working flow path, a variable first left orifice connected to the main flow path and to the left working flow path, a variable first right orifice connected to the main flow path and to the right working flow path, a variable second left orifice connected to the left working flow path and to the tank flow path, a variable second drive orifice connected to the right working flow path and to the tank flow path, and a measuring motor.

BACKGROUND

Such a hydraulic steering unit is known, for example, from U.S. Pat. No. 4,676,334 A. Variable first and second orifices are arranged in a kind of Wheatstone bridge. When a steering motor connected to the working port arrangement should be steered to the left, the variable first left orifice is opened and at the same time the variable second right orifice is opened so that the flow of hydraulic fluid is directed through the left working flow path to the steering motor and from the steering motor back through the right working flow path to the tank.

SUMMARY

The object underlying the present invention is to enable a comfortable steering.

This object is solved with a hydraulic steering unit as described at the outset in that a measuring motor is arranged in one of the working flow paths.

When the hydraulic steering unit is operated, a driver of a vehicle actuates a steering wheel or any other command means. This actuation causes an opening of a first orifice on the one side and of a second orifice on the other side depending on the desired direction of steering. The measuring motor is driven by the fluid flowing from the pressure port to the working port arrangement. The measuring motor is operatively connected to the variable orifices to bring them back to their original opening degree which may be closed or opened to a minimum extend once the necessary amount of fluid has been supplied to the working port arrangement. Since the measuring motor is arranged in one of the working flow paths, there is no dead band when changing from one steering direction to the other.

In an embodiment of the invention a variable main orifice is arranged in the main flow path upstream the variable first left orifice and the variable first right orifice. By adding the main orifice, it is possible to lower the flow around the neutral position of the variable orifices in the "bridge" described above. An outcome of having a lower supply flow entering the bridge is that the general pressure level inside the bridge will be lowered and therefore the outer forces acting on the steering unit will have a greater impact on the other parts of the steering unit. Thereby the self-realignment capabilities are improved.

In an embodiment of the invention the main orifice is closed in a neutral position of the steering unit. The main orifice can be used to realize a closed neutral steering unit.

In an embodiment of the invention the main orifice has a minimum opening in the neutral position of the steering unit. In this case the main orifice just lowers the flow of hydraulic fluid around the neutral position of the variable orifices in the bridge.

In an embodiment of the invention a tank orifice is arranged in the tank flow path. The tank orifice can be used for creating a back pressure to improve stability. In other words, the pressure in working chambers of a steering motor connected to the working port arrangement can be kept on a rather high level.

In an embodiment of the invention the tank orifice is a variable orifice. When the tank orifice is a variable orifice, it is also possible to decrease the resistance across the second variable orifice, wherein the right or left second orifice depends on the direction of steering.

In an embodiment of the invention a variable third left orifice is arranged in the left working flow path and a variable third right orifice is arranged in the right working flow path. This makes it possible to realize a close neutral steering unit in an open-center system. The third orifices prevent in a neutral position high pressures in pressure chambers of a steering motor connected to the working port arrangement. In a neutral position the working flow paths are interrupted so that the hydraulic fluid is trapped in the working flow path and in the respective pressure chambers of the steering motor.

In an embodiment of the invention the variable third left orifice and variable third right orifice open faster than the variable first left orifice and the variable first right orifice. The third orifices open as fast as possible. They are used only to trap hydraulic fluid in the working flow path.

BRIEF DESCRIPTION OF THE DRAWINGS

Embodiments of the invention are now described in more detail with reference to the drawing, in which.

DETAILED DESCRIPTION

Figure 1:
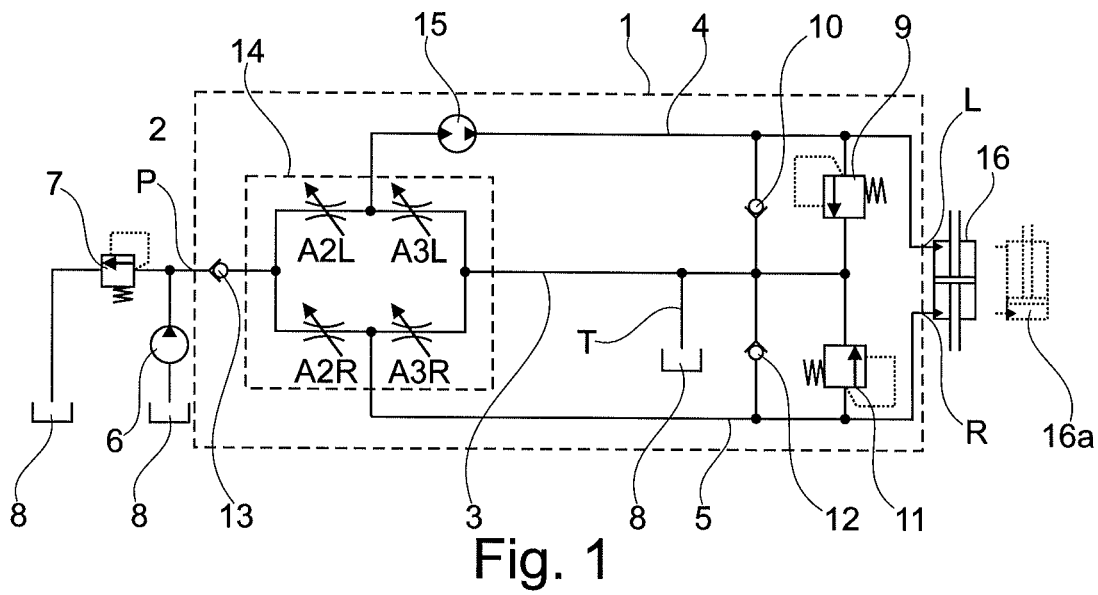
FIG. 1 shows a schematic illustration of a steering unit.

FIG. 1 schematically shows a hydraulic steering unit 1 comprising a supply port arrangement having a pressure port P and a tank port T. Furthermore, the hydraulic steering unit 1 comprises a working port arrangement having a left working port L and a right working port R. The terms "left" and "right" are used in the following description to abbreviate the illustration. They are not intended to define any directions in the space.

The pressure port P is connected to a main flow path 2. The tank port T is connected to a tank flow path 3. The left working port L is connected to a left working flow path 4 and the right working port R is connected to a right working flow path 5.

Schematically shown is a pump 6 connected to the pressure port P and a relief valve 7 connected to a tank 8.

The left working flow path 4 is connected to the tank flow path 3 by means of a relief valve 9 and by means of a check valve 10 opening from the tank flow path 3 in a direction to the left working flow path 4. In a similar way the right working flow path 5 is connected to the tank flow path 3 by means of a relief valve 11 and by means of a check valve 12 opening in a direction from the tank flow path 3 to the right working flow path 5.

A check valve 13 is arranged in the main flow path 2 opening in a direction away from the pressure port P.

Flow of hydraulic fluid from the pressure port P to one of the working ports L, R and from the other of the working ports R, L to the tank port T is controlled by means of an orifice arrangement. The orifice arrangement is in form of a bridge 14 having a first variable left orifice A2L connected to the main flow path 2 and to the left working flow path 4, a variable second left orifice A3L connected to the left working flow path 4 and to the tank flow path 3, a variable first right orifice A2R connected to the main flow path 2 and to the right working flow path 5, and a variable second right orifice A3R connected to the right working flow path 5 and to the tank flow path 3.

A measuring motor 15 is arranged in the left working flow path 4.

When, for example, the steering motor should be steered to a left, the variable first left orifice A2L and the variable second right orifice A3R are opened so that hydraulic fluid from the pressure port P can flow through the main flow path, the first left orifice A2L, the left working flow path 4 to the working port L and from there to the steering motor 16, wherein hydraulic fluid coming back from the steering motor 16 enters the steering unit 1 via the right working port R and flows back to tank 8 via the right working flow path 5 and the second right orifice A3R.

Opening and closing of the variable orifices can be performed various ways.

A preferred embodiment comprises a spool and a sleeve wherein the spool is rotatably arranged within a housing and the sleeve is rotatably arranged within the spool. When a steering wheel is actuated, the spool is rotated out of a neutral position relatively to the sleeve in order to open the orifices which are needed for the required flow. The required flow passes through the measuring motor 15. The measuring motor 15 is connected to the spool-sleeve-arrangement to return the spool and sleeve to their original position, i.e. their neutral position. In this way it is possible to deliver just the amount of hydraulic fluid to the steering motor 16 which is needed.

It should be mentioned, that not only a symmetric steering motor 16 can be used, but also an asymmetric steering motor 16*a* which is shown with dotted lines.

Since the measuring motor 15 is arranged in the left working flow path hydraulic fluid flows through the motor 15 in one direction when steering is performed in one direction and hydraulic fluid flows in the other direction through the measuring motor 15 when steering is performed in the opposite direction. In this way a dead band of the steering unit is avoided or dramatically reduced.

Figure 2:
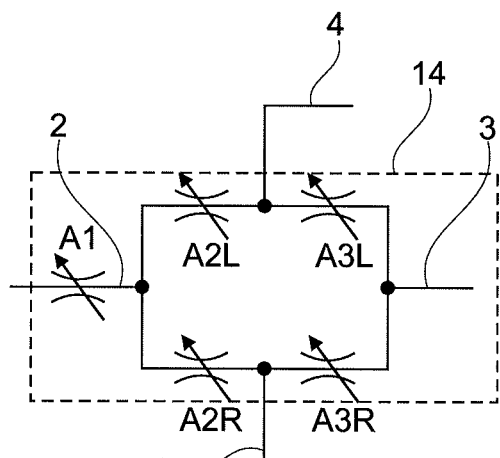
FIG. 2 shows a part of the steering unit having a second embodiment.

A second embodiment of the bridge 14 is shown in FIG. 2. In all figures same elements are referred to with the same reference numerals.

In the embodiment shown in FIG. 2 a variable main orifice A1 is arranged in the main flow path 2 upstream the variable first left orifice A2L and the variable first right orifice A2R. The main orifice A1 is in a first embodiment closed in the neutral position so that no hydraulic fluid can reach the variable first left orifice A3L and the variable first right orifice A2R. In this way a closed neutral can be achieved.

In another embodiment the main orifice A1 can allow a small permanent flow. However, this flow is minimized in the neutral position. An outcome of having a lower supply flow entering the bridge 14 is that the general pressure level inside the bridge 14 will be lowered and therefore the outer forces acting on the steering motor 16 will have a greater impact on the steering system, in particular the gear set of the measuring motor 15, thereby improving the self-realignment capabilities.

Figure 3:
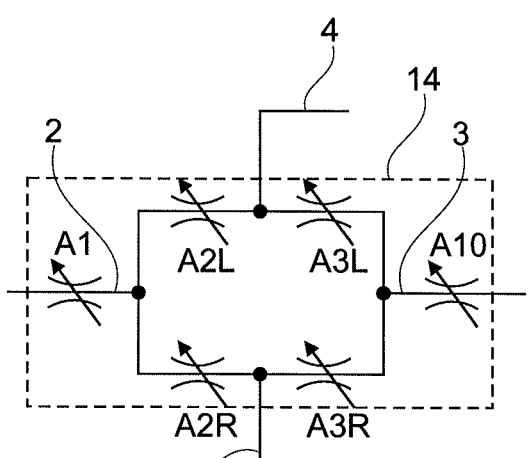
FIG. 3 shows a part of the steering unit having a third embodiment.

FIG. 3 shows a further modification of the embodiment of FIG. 2. In this embodiment a tank orifice A10 is arranged in the tank flow path 3.

When the tank orifice A10 is a fixed orifice, it can be used for creating a back pressure that is independent on the opening degree of first and second orifices in their respective flow paths. When a spool-sleeve-set is used, the back pressure is independent of the spool-sleeve-angle for improved stability.

It is, however, also possible to use a variable tank orifice A10 to decrease the resistance across the variable second orifices A3L, A3R and to improve the emergency steering.

Figure 4:
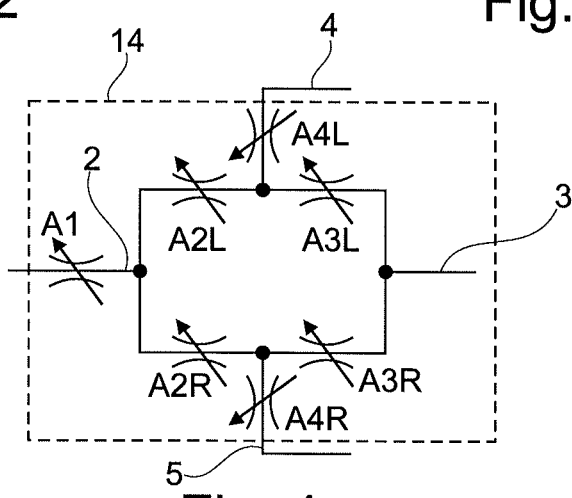
FIG. 4 shows the part of the steering unit having a fourth embodiment.

FIG. 4 shows another modification of the embodiment shown in FIG. 2. In the embodiment of FIG. 4 there is a variable third left orifice A4L arranged in the left working path 4 and a variable third right orifice A4R is arranged in the right working flow path. This allows for the possibility to make a closed-neutral set of orifices in an open-center system. In particular, when a spool and a sleeve are used, it is possible to make a closed-neutral spool-sleeve set.

The variable third left orifice A4L and the variable third right orifice A4R open faster than the variable first left orifice A2L and the variable first right orifice A2R. The variable third orifices are in principle used to cut off the working flow path and to trap hydraulic fluid in the working flow path and in the respective pressure chambers of the steering motor 16.

It is, of course, possible to use a tank orifice A10 as well in the embodiment shown in FIG. 4.

While the present disclosure has been illustrated and described with respect to a particular embodiment thereof, it should be appreciated by those of ordinary skill in the art that various modifications to this disclosure may be made without departing from the spirit and scope of the present disclosure.

The invention claimed is:

1. A hydraulic steering unit comprising a supply port arrangement having a pressure port connected to a main flow path and a tank port connected to a tank flow path, a working port arrangement having a left working port (L) connected to a left working flow path and a right working port (R) connected to a right working flow path, a variable first left orifice (A2L) connected to the main flow path and to the left working flow path, a variable first right orifice (A2R) connected to the main flow path and to the right working flow path, a variable second left orifice (A3L) connected to the left working flow path and to the tank flow path, and a variable second right orifice (A3R) connected to the right working flow path and to the tank flow path, wherein a measuring motor is arranged in one of the working flow paths, and wherein a variable third left orifice (A4L) is arranged in the left working flow path and a variable third right orifice (A4R) is arranged in the right working flow path.

2. The hydraulic steering unit according to claim 1, wherein a variable main orifice (A1) is arranged in the main flow path upstream the variable first left orifice (A2L) and the variable first right orifice (A2R).

3. The hydraulic steering unit according to claim 2, wherein the main orifice (A1) is closed in a neutral position of the steering unit.

4. The hydraulic steering unit according claim 3, wherein a tank orifice (A10) is arranged in the tank flow path.

5. The hydraulic steering unit according to claim 2, wherein the main orifice (A1) has a minimum opening in the neutral position of the steering unit.

6. The hydraulic steering unit according claim 5, wherein a tank orifice (A10) is arranged in the tank flow path.

7. The hydraulic steering unit according claim 2, wherein a tank orifice (A10) is arranged in the tank flow path.

8. The hydraulic steering unit according to claim 1, wherein a tank orifice (A10) is arranged in the tank flow path.

9. The hydraulic steering unit according to claim 8, wherein the tank orifice (A10) is a variable orifice.

10. The hydraulic steering unit according to claim 1, wherein the variable third left orifice (A4L) and the variable third right orifice (A4R) open faster than the variable first left orifice (A2L) and the variable first right orifice (A2R).

11. A hydraulic steering unit comprising a supply port arrangement having a pressure port connected to a main flow path and a tank port connected to a tank flow path, a working port arrangement having a left working port (L) connected to a left working flow path and a right working port (R) connected to a right working flow path, a variable first left orifice (A2L) connected to the main flow path and to the left working flow path, a variable first right orifice (A2R) connected to the main flow path and to the right working flow path, a variable second left orifice (A3L) connected to the left working flow path and to the tank flow path, and a variable second right orifice (A3R) connected to the right working flow path and to the tank flow path, wherein a measuring motor is arranged in one of the working flow paths,
wherein a variable main orifice (A1) is arranged in the main flow path upstream the variable first left orifice (A2L) and the variable first right orifice (A2R), and
wherein the main orifice (A1) has a minimum opening in the neutral position of the steering unit.

12. The hydraulic steering unit according to claim 11, wherein a variable third left orifice (A4L) is arranged in the left working flow path and a variable third right orifice (A4R) is arranged in the right working flow path.

13. The hydraulic steering unit according to claim 12, wherein the variable third left orifice (A4L) and the variable third right orifice (A4R) open faster than the variable first left orifice (A2L) and the variable first right orifice (A2R).

14. The hydraulic steering unit according claim 11, wherein a tank orifice (A10) is arranged in the tank flow path.

15. The hydraulic steering unit according to claim 14, wherein the tank orifice (A10) is a variable orifice.

* * * * *